United States Patent
Fukuda

[15] 3,653,315
[45] Apr. 4, 1972

[54] FLASH CUBE ROTATING DEVICE
[72] Inventor: Susumu Fukuda, Nishinomiya-shi, Japan
[73] Assignee: Fuji Photo Film Co., Ltd., Ashigara-Machi, Ashigara-Kamigun, Kanagawa, Japan
[22] Filed: Nov. 24, 1969
[21] Appl. No.: 879,071

[30] Foreign Application Priority Data
Nov. 27, 1968 Japan..............................43/103428

[52] U.S. Cl. .............................95/11 L, 95/10 C, 240/37.1
[51] Int. Cl. .........................................................G03b 17/38
[58] Field of Search..................95/10 C, 11 R, 11 L, 11.5 R; 240/37, 37.1

[56] References Cited
UNITED STATES PATENTS
3,464,333  9/1969  Aoki et al. .........................95/11.5 X
3,406,620  10/1968  Hochreiter et al. ....................95/11 X Primary Examiner—Samuel S. Matthews
Assistant Examiner—Fred L. Braun
Attorney—Sughrue, Rothwell, Mion, Zinn & Macpeak

[57] ABSTRACT

A rotating base supports a flash cube, the base is connected to a ratchet wheel which in turn engages a stopper, The stopper is moved out of engaging position with the ratchet wheel in response to movement of the pointer of an exposure meter when the meter indicates the necessity for flash light operation for proper exposure of the film.

4 Claims, 3 Drawing Figures

Patented April 4, 1972

3,653,315

INVENTOR
SUSUMU FUKUDA

BY Sughrue, Rothwell, Mion,
Zinn & Macpeak

ATTORNEYS

FLASH CUBE ROTATING DEVICE

BACKGROUND OF THE INVENTION

1. Field of the Invention

This invention relates to cameras employing rotatable flash cubes, and more particularly to a novel rotating device for supplying flash lamps, one by one by rotating a multi-lamp flash-cube which carries individual flash lamps on the faces thereof.

2. Description of the Prior Art

Flash lamps are employed when the object being photographed is so dark as to require additional artificial illumination. When using the conventional automatic exposure controlling cameras, the condition of illumination has to be judged or measured by the photographer. Therefore, there have been in many cases, misjudgements by the photographer resulting in the failure in obtaining good photographs even when using conventional automatic cameras. Some of the prior art cameras are equipped with a flash cube device for providing artificial illumination. The flash-cube constitutes a block or cube-like unit bearing multiple flash lamps on respective faces to supply artificial illumination by flashing the lamps, one by one, according to the necessity for flashing the same. Of course, in this case the need for employing flash lighting must also be judged by the photographer. Therefore, those operators who cannot adequately judge the illumination condition at hand, or who are not acquainted with the necessary photographic techniques are incapable of taking good pictures by use of conventional automatic cameras.

SUMMARY OF THE INVENTION

The present invention provides a flash-cube rotating device which rotates the flash cube automatically so as to provide a flash lamp for taking pictures only when flash lighting is really required, that is only when it is sufficiently dark as to necessitate the taking of the picture with the aid of a flash light. The present invention further provides a flash-cube rotating device which is operatively coupled to an automatic exposure controlling device. The present invention further provides such a flash cube rotating device which is operated by the mere act of pushing down on the shutter button.

DESCRIPTION OF THE PREFERRED EMBODIMENT

Figure 1:
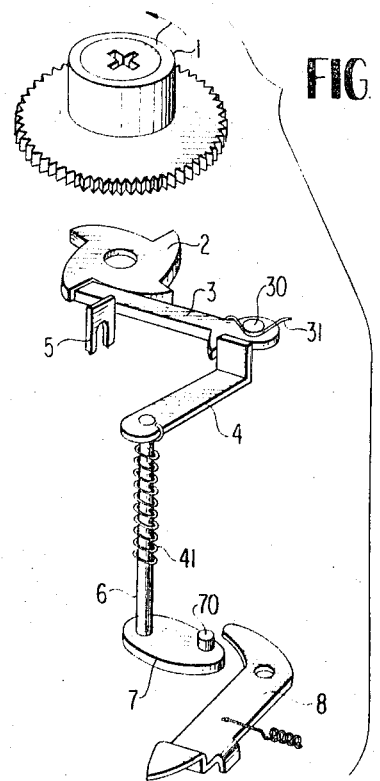
FIG. 1 is a perspective view of a portion of a camera illustrating the flash cube rotating device of the present invention under locked conditions.
Figure 2:
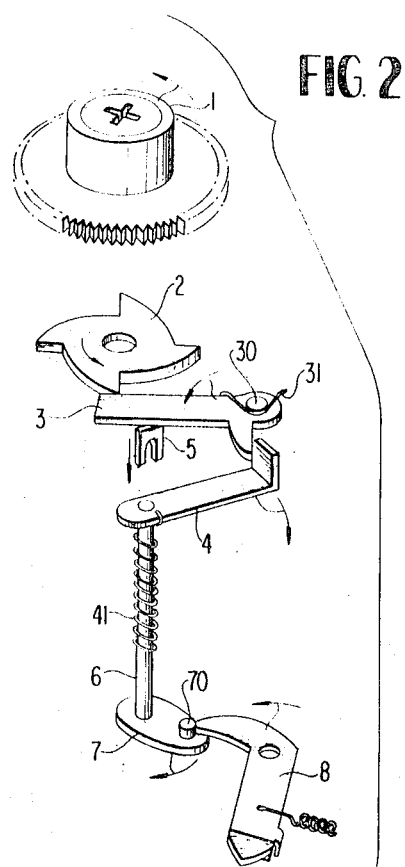
FIG. 2 is a similar perspective view of the flash cube rotating device as that of FIG. 1 under release conditions.

Referring to the drawings, FIG. 1 illustrates perspectively, a rotatable flash cube holding base 1 with a ratchet wheel 2 fixed to the rotatable base. The ratchet wheel 2 has four teeth and is urged to rotate in a counterclockwise direction (by means not shown). It is not necessary for the ratchet wheel 2 to be fixed to the base 1 under all circumstances, but it must be interconnected thereto through some means so as to rotate therewith. Further, while the number of teeth shown for the ratchet wheel 2 is equal to the number of flash cubes or lamps carried by the flash cube (not shown) supported by base 1, this is not always necessary. A lever 3 is pivotally mounted by pin 30 and urged to rotate in a counterclockwise direction by means of spring 31. The lever 3 is prevented from rotation by a stop 5 in releasing lever 4 such that the lever 3 is normally in such a position as to engage one of the teeth of the ratchet wheel 2. The lever 4 is fixed to a rod 6 and is urged to rotate in a counterclockwise direction by means of spring 41. The force of the spring 41 is stronger than the force of spring 31 so that the lever 4 prevents lever 3 from rotating in a counterclockwise direction even if the stop 5 is disengaged from lever 3. The lower end of rod 6 is fixed to a lever 7 which carries a pin 70. The lever 7 is so located and so positioned, that it is rotated in a counterclockwise direction by rotation of an L-shaped lever 8 which is mounted for rotation about an axis passing through the hole as shown, the lever rotating in a counterclockwise direction in response to shutter release. The stop 5 is only partially shown in FIGS. 1 and 2, but is fully shown in FIG. 3 and the construction and arrangement of the stop is only exemplary of such mechanisms. The stop 5 is associated with a pivoted lever 51, the lever 51 being mounted for pivotable movement about a pivot pin 50. The lever 51 is provided with a pin 53 at one end thereof so as to engage with a shutter release lever 9. The lever 51 is also urged to rotate in the counterclockwise direction as shown by the arrow by means of spring 52 so that the lever rotates to cause the left end of the lever 51 to move down in response to any downward motion of the shutter release lever 9 as indicated by the straight arrow. The other end of lever 51 is in engagement with the pointer 101 of an exposure meter 100 which is so mounted that, with engagement between lever 51 and pointer 101, the lever 51 is prevented from rotating in the counterclockwise direction under the bias of spring 52. The end of lever 51 which engages with the pointer 101 is provided with a taper so that the inclination of the lever 51 after the lever is stopped in its counterclockwise rotation by the pointer 101 varies in accordance with the light value perceived by the exposure meter 100. Thus, the inclination of lever 51 controls the exposure of the camera. As for the construction for making the inclination of the lever control the exposure of the camera, various conventional mechanisms may be used. The pointer 101 is so arranged that it moves out of engagement with lever 51 when the pointer moves into the under exposure side of the movable range of the pointer.

The operation and effects of the construction of the present invention as described above is now described in detail.

Under the ordinary correct exposure range of the automatic exposure arrangement as constructed, the pointer 101 of the exposure meter 100 remains engaged with the right end portion of lever 51. Therefore, the pointer 101 keeps the lever 51 at the position shown in FIG. 3, after the shutter release lever 9 moves down. Thus, the stop 5 is maintained in engagement with lever 3 as illustrated.

Accordingly, within the above described arrangement, the stop 5 is held at the position shown in FIG. 1 and the lever 3 prevents the wheel 2 from rotating and thus the flash cube is maintained in position. In this case, the position of pointer 101 determines the inclination of lever 51 and the inclination of the lever 51 determines in turn, the exposure value of the camera through conventional exposure controlling means.

Figure 3:
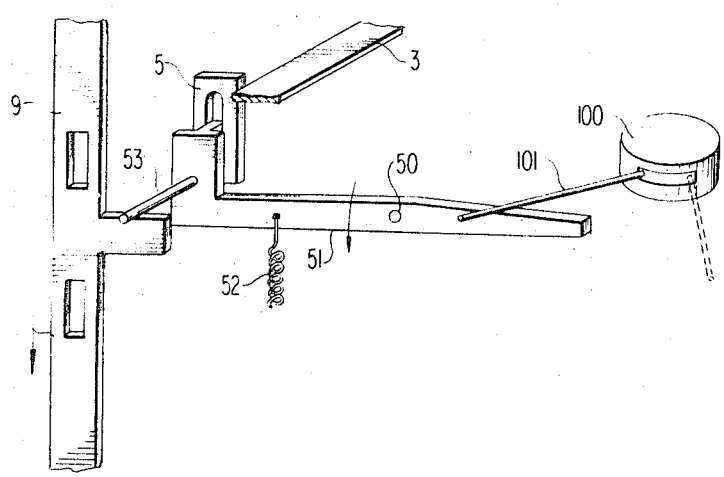
FIG. 3 is a perspective view of one embodiment of the stop device employed with the flash-cube rotating device of the present invention.

When conditions change such that exposure is under the correct value the pointer 101 of course moves out of engagement with lever 51 and moves to the dotted line position shown in FIG. 3. In this situation, the lever 51 rotates in a counterclockwise direction since it is not stopped by the pointer 101 and is biased in the counterclockwise direction by spring 52. This occurs in response to the movement of shutter release lever in the direction of the arrow, that is downwardly. The stop 5 associated with lever 51 also moves downwardly and out of the position of engagement with lever 3. Then, in response to the downward movement of shutter release lever 9, the L-shaped lever 8, FIG. 2, rotates instantly in a counterclockwise direction as shown. Accordingly, due to the rotation of lever 8, the shutter operates, and by means not shown, the flash light is energized. At the same time, in response to rotation of the lever 8, the lever 7 is forced to rotate clockwise because of engagement between pin 70 and lever 8. The lever 7 rotates in a clockwise direction along with lever 4 which in turn rotates the lever 3 counterclockwise. Therefore, the ratchet wheel 2 is released to rotate in a counterclockwise direction. During the counterclockwise rotation of ratchet wheel 2, the L-shaped lever 8, the lever 7 and lever 4 are returned to their original positions. The lever 3 is accordingly returned to its original position allowing but a single pitch rotation of ratchet wheel 2. Since the ratchet wheel 2 is fixed to the flash cube holding base 1, the used flash light changes position and a new one moves into position according to the rotation of ratchet wheel 2.

When the shutter release lever 9 again moves upwardly, the lever 51 is rotated clockwise and the stop 5 is moved back to its original position, thus, the position of all elements revert to that of FIG. 1.

As described hereinabove, the shutter button is the only member to be operated manually. By just operating the shutter button, all of the elements previously described operate automatically and a correct exposure may be obtained through either the automatic exposure controlling device or the flash light. In accordance with the brightness of the object being photographed, the automatic exposure controlling device or the flash light device is automatically selected. This simplified construction reduces the cost of the camera and reduces further accidents in the use of the same.

What is claimed is:

1. In a flash cube rotating device for a camera carrying an exposure controlling device with a movable indicator rod, a shutter and a flash device including a flash cube having a plurality of flashlamps which are individually changed in response to flashing of the same, the improvement comprising:

a flash cube holding base rotatably mounted on said camera body;

a ratchet wheel operatively coupled to said flash cube holding base to normally prevent said flash cube holding base from being rotated;

a first lever engaging said ratchet wheel for preventing said ratchet wheel from rotating and serving as a stop for the ratchet wheel, said first lever being urged to rotate in the release direction;

a spring biased second lever engaging said first lever so as to hold the first lever in engagement with said ratchet wheel;

a stop member engaging said first lever for preventing said first lever from rotating, and means for disengaging said stop member from said first lever only when the exposure controlling device of said camera indicates operation of the camera outside of the normal operating range so that it requires operation of the flash device including a third lever connected to said stop member, said third lever controllably released by the movable indicator rod when it indicates operation beyond the normal operating range.

2. The flash cube rotating device as claimed in claim 1 further comprising means for insuring that said biased second lever is disengaged from said first lever only after shutter operation.

3. The flash cube rotating device as claimed in claim 1, where said third lever is pivotable and further includes biasing means fixed to said pivotable third lever tending to bias said stop member away from said first lever and wherein said movable indicator rod is normally positioned in the path of said third pivotable lever so as to prevent said biasing means from disengaging said stop member from said first lever.

4. The flash cube rotating device as claimed in claim 3, further including a pin and a shutter release member, the pin extending from said third pivotable lever and engageable with said shutter release member such that regardless of the position of said movable indicator rod, said third pivotable biased lever is prevented from rotating until said shutter release member is operated to activate said shutter.

* * * * *